(12) United States Patent
Yamakawa et al.

(10) Patent No.: US 12,441,290 B2
(45) Date of Patent: Oct. 14, 2025

(54) CONTROL DEVICE FOR A BATTERY-POWERED VEHICLE

(71) Applicant: Mazda Motor Corporation, Hiroshima (JP)

(72) Inventors: Hirotaka Yamakawa, Aki-gun (JP); Ryusuke Sagawa, Aki-gun (JP); Kengo Nakashima, Aki-gun (JP); Koichi Sugimoto, Aki-gun (JP); Hiroshi Minamoto, Aki-gun (JP); Masahiro Miyazaki, Aki-gun (JP); Daisuke Shimo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/950,437

(22) Filed: Nov. 18, 2024

(65) Prior Publication Data

US 2025/0187579 A1 Jun. 12, 2025

(30) Foreign Application Priority Data

Dec. 11, 2023 (JP) ................. 2023-208710

(51) Int. Cl.
    *B60W 10/06* (2006.01)
    *B60W 10/02* (2006.01)
    *B60W 20/13* (2016.01)

(52) U.S. Cl.
    CPC ............ *B60W 10/06* (2013.01); *B60W 10/02* (2013.01); *B60W 20/13* (2016.01); *B60W 2510/244* (2013.01)

(58) Field of Classification Search
    CPC ............... B60W 10/02; B60W 10/06; B60W 2510/244; B60W 20/13; B60W 20/14
    See application file for complete search history.

(56) References Cited

U.S. PATENT DOCUMENTS

| 10,017,039 | B1* | 7/2018 | Colavincenzo | ....... B60W 10/06 |
| 2005/0090365 | A1* | 4/2005 | Tamai | ................... B60K 6/543 |
| | | | | 477/37 |
| 2019/0337504 | A1* | 11/2019 | Kelly | ............. B60W 30/18136 |
| 2021/0309205 | A1* | 10/2021 | Moon | .................... F16D 48/10 |
| 2022/0001851 | A1 | 1/2022 | Namba et al. | |

FOREIGN PATENT DOCUMENTS

WO 2020095536 A1 5/2020

* cited by examiner

*Primary Examiner* — Edwin A Young
(74) *Attorney, Agent, or Firm* — Alleman Hall & Tuttle LLP (57) ABSTRACT

A control device of a vehicle includes a controller. The vehicle includes an engine having an exhaust system including a combustion chamber and a catalyst, a motor able to operate drive wheels of the vehicle, and a battery which supplies driving power to the motor when the motor operates the drive wheels (motor assist operation), and is charged when the motor generates power (regenerative operation). During deceleration, the controller performs one of a first control which increases an engine resistance for a higher deceleration than requested, and performs the motor assist operation according to the engine resistance increase, when a battery state of charge (SOC) is a first given value or above; and a second control which controls a combustion state of the engine to raise a catalyst temperature, and performs the regenerative operation, when the battery SOC is a second given value below the first given value.

15 Claims, 7 Drawing Sheets

CONTROL DEVICE FOR A
BATTERY-POWERED VEHICLE

TECHNICAL FIELD

The present disclosure relates to a control device of a hybrid vehicle including both an engine and a motor as driving sources.

BACKGROUND OF THE DISCLOSURE

Hybrid vehicles equipped with an engine formed with a combustion chamber and an electric motor as driving sources, are becoming widespread. An exhaust system of the engine is provided with a catalytic converter which neutralizes exhaust gas. For diesel engines, an exhaust emission control device including an SCR (Selective Catalytic Reduction) catalyst for removing $NO_x$ may be used. It is crucial to maintain the catalyst at an appropriate operating temperature to keep it active. WO2020/095536A1 discloses a control device which, if a catalyst temperature in a hybrid vehicle is below a given temperature, performs a catalyst temperature increase control while performing a motoring operation in which an engine is rotated in a fuel-cut state.

In the hybrid vehicles, during deceleration, regenerative braking based on a regenerative resistance of the motor may be used in a state where the engine is disconnected from the drivetrain. Here, the power generated by the motor is stored in a battery. Consequently, in a driving scenario in which the vehicle decelerates, for example, on a long downhill, an SOC (state of charge) of the battery may reach its upper limit. In such a case, the engine is connected to the drivetrain and put into a motoring state, allowing the use of engine braking. However, since the engine may remain inactive for a relatively long period, the catalyst temperature may drop below a set temperature. In this situation, it is effective to induce combustion inside engine cylinders to the extent that it maintains the catalyst temperature. However, if compensating for the loss of engine braking due to combustion with regenerative braking is attempted, the SOC may exceed its upper limit. Thus, an issue may arise where the combustion for maintaining the catalyst temperature cannot be performed.

SUMMARY OF THE DISCLOSURE

One purpose of the present disclosure is to provide a vehicle control device, which maintains a temperature of a catalyst of an exhaust emission control device in a hybrid vehicle, while also considering SOC of a battery.

A control device of a vehicle according to one aspect of the present disclosure is a control device of a vehicle. The vehicle includes an engine having an exhaust system provided with a combustion chamber and a catalyst, and configured to generate a driving force to operate drive wheels of the vehicle, a motor able to operate the drive wheels, and a battery which supplies driving power to the motor in a motor assist operation in which the motor operates the drive wheels, and is charged in a regenerative operation in which the motor generates power. The control device includes a controller which controls operation of the vehicle. When the vehicle decelerates, the controller performs one of a first control in which an engine resistance is increased to obtain a higher deceleration than a requested deceleration and a motor assist operation is performed according to the increase of the engine resistance, when a state of charge (SOC) of the battery is a first given value or above; and a second control in which a combustion state of the engine is controlled to raise a temperature of the catalyst, and the regenerative operation is performed, when the SOC of the battery is a second given value that is below the first given value.

According to this aspect, one of the first control and the second control is performed according to the SOC of the battery. In the first control, while the engine resistance is increased so that engine braking is enhanced, the motor assist operation is performed so that the power of the battery is consumed, that is, the SOC is decreased. On the other hand, in the second control, the engine is controlled to perform combustion to maintain the temperature of the catalyst. Further, the motor is controlled to perform the regenerative operation by using margin of the SOC, which is a difference between the first given value and the second given value, to generate the regenerative braking. Thus, both suppression of battery overcharge and maintenance of the catalyst temperature can be achieved.

In the above control device of the vehicle, the controller may perform the first control and the second control when the temperature of the catalyst is below a set temperature during deceleration of the vehicle, and switch the control mode to the second control when the SOC drops to the second given value by performing the first control.

According to this configuration, even when the catalyst temperature is below the set temperature, the cooperative control is performed in which the first control is first performed to discharge the battery and create the margin for the SOC, and then the second control is performed to raise the temperature of the catalyst. An excessive deceleration torque generated by enhancing the engine braking in the first control can be offset by the motor torque gained from the motor assist operation. Additionally, the second control following the first control can create the deceleration equivalent to the engine braking loss through the regenerative braking. Therefore, drivability can be maintained without causing discomfort to a vehicle driver during deceleration.

In the above control device of the vehicle, the vehicle may further include a clutch which changes a torque transmission state between an output shaft of the engine and a drive shaft of the drive wheels. The controller may perform a third control in which the clutch is engaged and the engine is operated in a fuel-cut state to generate a first engine resistance, when the SOC is the first given value or above and the temperature of the catalyst is above the set temperature in a state where the clutch is released to disconnect the engine from the drive shaft and the vehicle decelerates by a regenerative resistance generated by the regenerative operation of the motor, and the first control using a second engine resistance that is above the first engine resistance, when the temperature of the catalyst decreases to be below the set temperature during the third control.

According to this configuration, when the SOC is the first given value or above in a state where the vehicle decelerates by the regenerative braking, the third control in which motoring is performed to generate the engine braking is performed. Thus, the increase of the SOC can be suppressed. Further, when the catalyst temperature becomes below the set temperature during the third control, the first control is performed using the increased engine resistance to enhance the engine braking. This increase of the engine braking is offset by the motor assist operation. Thus, drivability is maintained while decreasing the SOC to create a state where the second control which performs combustion to raise the catalyst temperature can be performed thereafter.

In the above control device of the vehicle, after the control mode is switched to the second control, the controller may switch the control mode to the first control when the SOC is the first given value or above while the vehicle continues to decelerate.

According to this configuration, during the deceleration of the vehicle, the first and second controls are repeated according to the SOC of the battery. Therefore, even while driving on a long downhill, the catalyst temperature can be maintained without overcharging the battery.

In the above control device of the vehicle, in the second control, the controller may control the combustion state so that a load of the engine becomes zero.

According to this configuration, in the second control, the engine performs combustion to only heat the catalyst, without generating a traveling torque. Therefore, the vehicle driver does not have a sensation of acceleration during the deceleration of the vehicle.

In the above control device of the vehicle, the controller may set the regenerative resistance of the motor in the second control so as to compensate for a loss of the engine resistance caused by switching from the first control to the second control.

According to this configuration, the deceleration equivalent to the engine braking lost due to termination of the first control can be compensated with the regenerative braking. Therefore, even when the control mode is switched from the first control to the second control, the vehicle driver is not given discomfort during deceleration.

In the above control device of the vehicle, the engine may be provided with a piston and a cylinder, and, as the control of increasing the engine resistance, the controller may perform a control of increasing a resistance of the piston by decreasing a pressure inside the cylinder to be lower than that of a surrounding environment. According to this configuration, the engine resistance can be increased easily by adjusting the in-cylinder pressure.

In the above control device of the vehicle, the vehicle may include a transmission arranged between output shafts of the engine and the motor, and the drive shaft of the drive wheels. As the control of increasing the engine resistance, the controller may perform a control of downshifting the gear of the transmission. According to this configuration, the engine resistance can be increased easily by downshifting.

In the above control device of the vehicle, as the control of raising the temperature of the catalyst, the controller may perform a fuel injection on expansion stroke of the engine.

According to this configuration, it makes possible to perform combustion which does not substantially generate an engine torque. Therefore, the catalyst temperature can be maintained during deceleration without causing acceleration.

In the above control device of the vehicle, the vehicle may include a booster which boosts air to be supplied into the combustion chamber of the engine. The controller may control the booster to increase a boosting pressure during the control of raising the temperature of the catalyst.

When the fuel injection is performed on the expansion stroke, the injected fuel tends to adhere to an inner wall of the cylinder. Increasing the boosting pressure shortens a traveling distance of the fuel injected into the cylinder, resulting in suppression of the fuel adhesion to the inner wall of the cylinder.

DETAILED DESCRIPTION OF THE DISCLOSURE

Hereinafter, a vehicle control device according to one embodiment of the present disclosure is described with reference to the accompanying drawings. The vehicle controlled by the control device of this embodiment is a hybrid vehicle equipped with an engine formed with a combustion chamber and an electric motor as travel driving sources for operating drive wheels of the vehicle, and a catalyst in an exhaust system of the engine.

Overall Configuration of the Hybrid Vehicle

Figure 1:
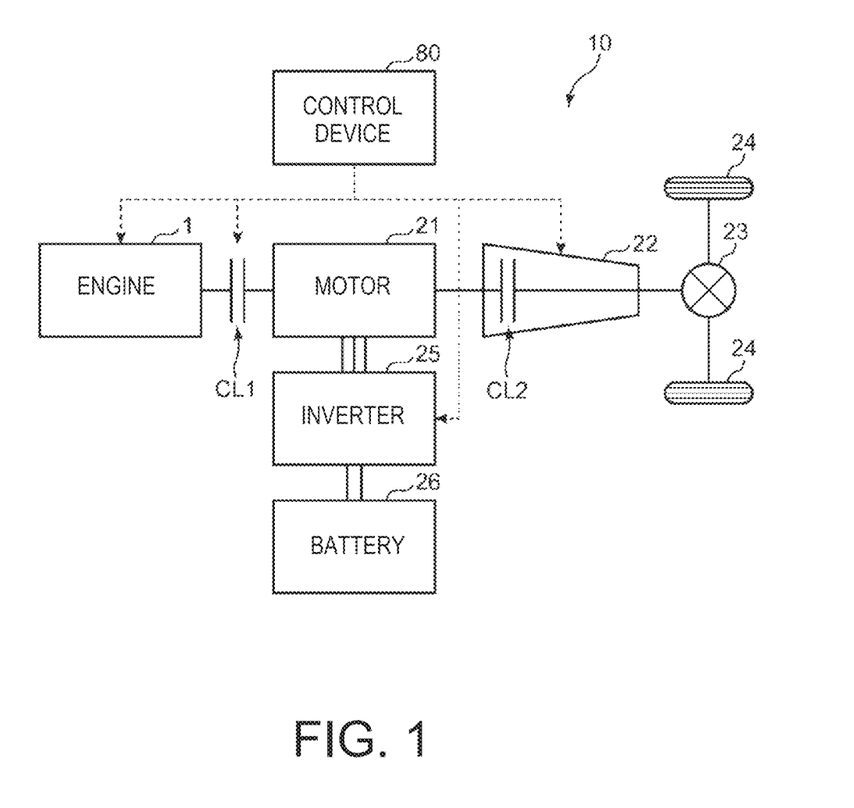
FIG. 1 is a block diagram schematically illustrating an overall structure of a hybrid vehicle to which a control device of the present disclosure is applied.

FIG. 1 is a block diagram illustrating a schematic configuration of a hybrid vehicle 10 according to this embodiment. The vehicle 10 includes an internal combustion engine 1, a motor 21, an automatic transmission 22, a clutch CL1, a differential device 23, drive wheels 24, an inverter 25, a battery 26, and a control device 80. Both the engine 1 and the motor 21 can provide a travel driving force to the drive wheels 24.

The engine 1 is an internal combustion engine which generates driving force by combusting fuel. The engine 1 of this embodiment is a four-cycle diesel engine which uses light oil as fuel. The engine 1 may also be a gasoline engine which uses gasoline as its primary fuel.

The motor 21 is, for example, a three-phase AC (alternating current) synchronous motor-generator which generates a driving force by receiving power supplied from the battery 26. During deceleration of the vehicle 10, the motor 21 performs a regenerative operation in which power is generated by the rotational force transmitted from the drive wheels 24. In this case, a regenerative resistance corresponding to the power generated by the motor 21 acts on the drive wheels 24. The regenerative resistance serves as a regenerative braking force to decelerate the vehicle 10. The generated power by the motor 21 is charged to the battery 26 via the inverter 25.

The engine 1 and the motor 21 are connected to each other arranged in series via the clutch CL1. The motor 21 is connected to a drive shaft of the drive wheels 24 via the automatic transmission 22 and the differential device 23. By this configuration, both the engine 1 and the motor 21 can drive the drive wheels 24 of the vehicle 10. The clutch CL1 connects or disconnects a crankshaft to or from a rotating shaft of the motor 21. The crankshaft is an output shaft of an engine body 2.

The automatic transmission 22 has a function of shifting and outputting the rotation of the output shaft of the engine 1 and the rotating shaft of the motor 21. The automatic transmission 22 includes an input shaft, a plurality of planetary gear mechanisms, a plurality of brake mechanisms, a plurality of clutch mechanisms, and an output shaft. The automatic transmission 22 changes a rotational speed of the rotating shaft by switching a transmission path of the rotational force inputted to the input shaft through operation of each of the mechanisms, and outputs it from the output shaft. The input shaft is connected to the rotating shaft of the motor 21. The output shaft is connected to the differential device 23 either directly or indirectly via the drive shaft. Note that the plurality of clutch mechanisms of the automatic transmission 22 can be broadly considered as a single clutch CL2, since they work together to realize a desired gear ratio. Therefore, when the clutch CL2 is disconnected, torque transmission between the input shaft and the output shaft is interrupted.

In a state where the clutch CL2 of the automatic transmission 22 is connected and the clutch CL1 is disconnected, only the driving force generated by the motor 21 is transmitted to the drive wheels 24 via the automatic transmission 22. On the other hand, in a state where both the clutch CL1 and CL2 are connected, the driving forces of both the engine 1 and the motor 21 are transmitted to the drive wheels 24. In this case, when the motor 21 does not generate the driving force, i.e., when no power is supplied to the motor 21, only the driving force generated by the engine 1 is transmitted to the drive wheels 24.

By the above driving modes, the vehicle 10 can travel in any of the following modes: a motor driving mode using only the driving force of the motor 21, a combined driving mode using the driving forces of both the motor 21 and the engine 1, and an engine driving mode using only the driving force of the engine 1. In the combined driving mode, a required torque of the vehicle 10 is shared between an engine torque generated by the engine 1 and a motor torque generated by the motor 21. For example, the combined driving mode generally aims at driving by the engine torque, but when the engine torque alone cannot meet the required torque, a motor assist operation compensates for the shortage with the motor torque. As will be explained later, in this embodiment, the term "motor assist operation" is also used for operation which, when engine braking is enhanced beyond a required deceleration rate, generates the motor torque to offset the enhanced engine braking.

The battery 26 is a rechargeable secondary battery. The battery 26 may be a lithium-ion battery or a nickel-metal hydride battery, for example. The battery 26 supplies driving power to the motor 21 via the inverter 25 when the motor 21 generates the driving force, including during motor assist operations. The battery 26 is charged by receiving the power generated during the regenerative operation of the motor 21 via the inverter 25.

The inverter 25 converts three-phase AC power into DC (direct current) power and vice versa. Specifically, when the motor 21 generates the driving force, the inverter 25 converts the DC power stored in the battery 26 into three-phase AC power and supplies it to the motor 21. On the other hand, when the motor 21 generates the three-phase AC power, the inverter 25 converts it into DC power and supplies it to the battery 26.

The control device 80 comprehensively controls the operations of the vehicle 10, including the engine 1, the motor 21, the inverter 25, the automatic transmission 22, and the clutch CL1, so that the vehicle 10 travels according to the driving conditions. The control device 80 is configured based on a well-known microcomputer, and is comprised of a CPU (Central Processing Unit) which executes various programs, and memory, such as ROM and RAM, for storing the programs and various data. The functional configuration of the control device 80 will be described later with reference to FIG. 3.

Overall Structure of Engine

Figure 2:
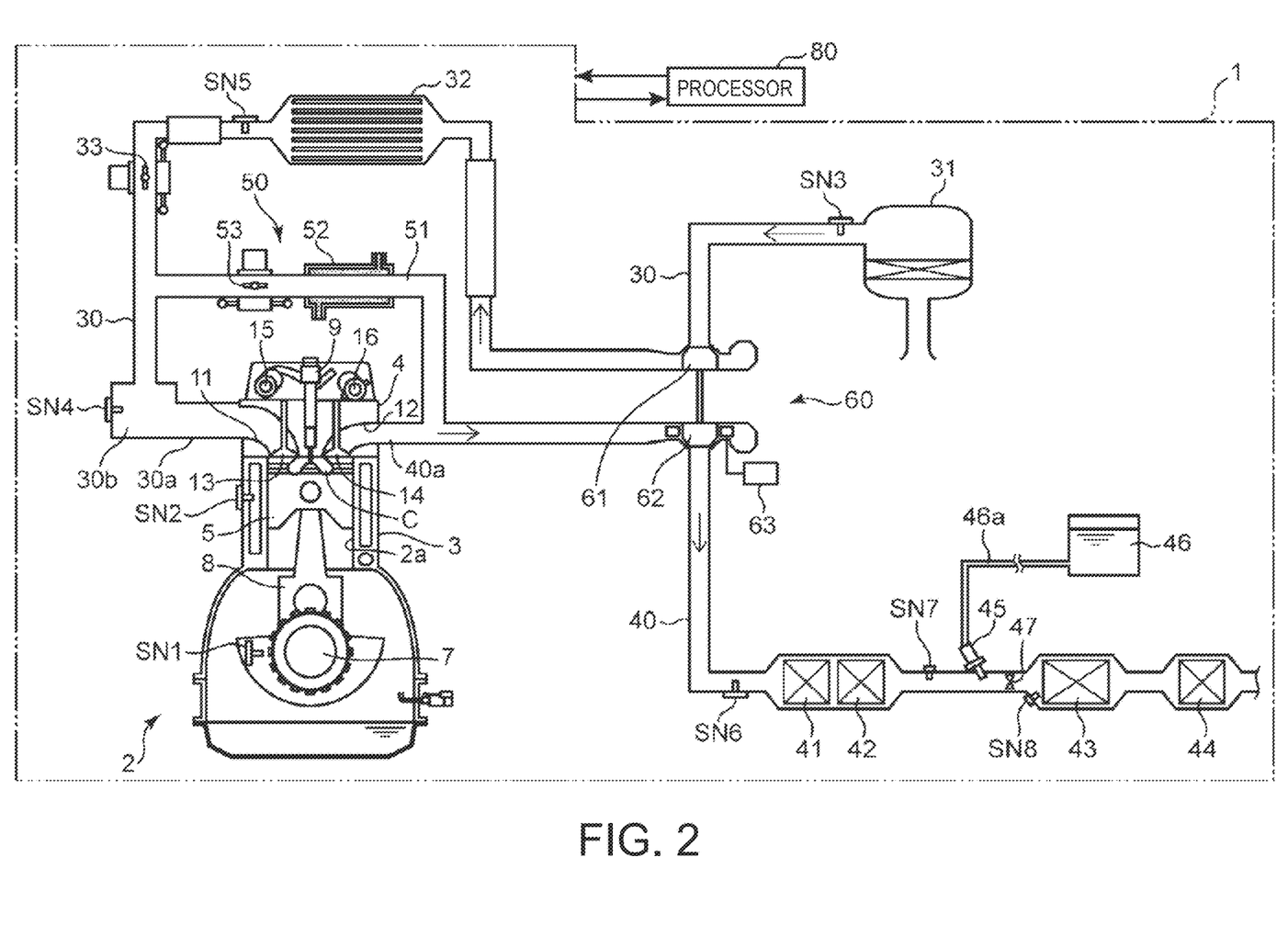
FIG. 2 is a system diagram of an engine of the vehicle.

FIG. 2 is a system diagram illustrating an overall structure of the engine. The engine 1 illustrated in FIG. 2 is a four-cycle diesel engine. The engine 1 includes the engine body 2, an intake passage 30 through which intake air flows into the engine body 2, an exhaust passage 40 through which exhaust gas discharged from the engine body 2 flows, an EGR (exhaust gas recirculation) device 50 which recirculates a portion of the exhaust gas from the exhaust passage 40 back to the intake passage 30, and an exhaust turbocharger 60 which boosts the intake air flowing through the intake passage 30. The engine 1 is controlled by the control device 80.

The engine body 2 has a plurality of cylinders 2a arranged orthogonally to the plane of FIG. 2. The engine body 2 includes a cylinder block 3, a cylinder head 4, and a plurality of pistons 5. The cylinders 2a are formed by the cylinder block 3 and the cylinder head 4. That is, a plurality of cylindrical spaces corresponding to the cylinders 2a are formed inside the cylinder block 3, and the cylinder head 4 is attached to an upper surface of the cylinder block 3, closing off these cylindrical spaces from their top. Each of the pistons 5 is accommodated within the cylinders 2a to be reciprocatably slidable.

A combustion chamber C is formed above each piston 5 of the cylinders 2a. The combustion chamber C is a space defined by a lower surface of the cylinder head 4, a cylinder liner forming a side circumferential surface of the cylinder 2a, and a crown surface of the piston 5. The combustion chamber C receives fuel injected from an injector 9, which will be described later. The piston 5 receives combustion energy of the fuel supplied to the combustion chamber C, and reciprocates in an up-and-down direction of the engine.

A crankshaft 7, which is the output shaft of the engine body 2, is provided below the piston 5 and in a lower part of the cylinder block 3. The crankshaft 7 is coupled to each piston 5 of the cylinder 2a via a connecting rod 8, and rotates around its central axis in response to the reciprocating motion of the pistons 5.

The cylinder block 3 is equipped with a crank angle sensor SN1 and a water temperature sensor SN2. The crank angle sensor SN1 detects a crank angle which is a rotational angle of the crankshaft 7, and an engine speed which is a rotational speed of the crankshaft 7. Based on a detection result of the crank angle sensor SN1, a vehicle speed and acceleration of the vehicle 10 can be calculated. The water temperature sensor SN2 detects a temperature of a coolant circulating inside the cylinder block 3 and the cylinder head 4 (i.e., an engine water temperature).

The injector 9 is attached to the cylinder head 4. The injector 9 supplies the fuel to the combustion chamber C of each cylinder 2a. The injector 9 is attached to the cylinder head 4 so that its tip part is exposed to the combustion chamber C. The tip part of the injector 9 is formed with a plurality of nozzles through which the fuel is injected. The fuel injected from each nozzle combusts in the combustion chamber C at a high temperature and a high pressure due to self-ignition caused by the compression of the piston 5.

The cylinder head 4 is formed with intake ports 11 and exhaust ports 12. The intake ports 11 connect the combustion chambers C of the respective cylinders 2a with the intake passage 30. The exhaust ports 12 connect the combustion chambers C of the respective cylinders 2*a* with the exhaust passage 40. The intake port 11 of each cylinder 2*a* is provided with an intake valve 13, and the exhaust port 12 of each cylinder 2*a* is provided with an exhaust valve 14.

The cylinder head 4 is equipped with an intake valve mechanism 15 and an exhaust valve mechanism 16. The intake valve mechanism 15 opens and closes the intake valve 13 in synchronization with the rotation of the crankshaft 7. The exhaust valve mechanism 16 opens and closes the exhaust valve 14 in synchronization with the rotation of the crankshaft 7. The intake valve 13 periodically opens and closes an opening of the intake port 11 on the combustion chamber C side in response to the operation of the intake valve mechanism 15. The exhaust valve 14 periodically opens and closes an opening of the exhaust port 12 on the combustion chamber C side in response to the operation of the exhaust valve mechanism 16.

The intake passage 30 introduces intake air into the combustion chamber C of each cylinder 2*a*. The intake passage 30 has an intake manifold 30*a* and a surge tank 30*b* in its downstream side section close to the engine body 2. The surge tank 30*b* provides an expanded space to equalize an introduction amount of intake air into each cylinder 2*a*. The intake manifold 30*a* includes a plurality of branch pipes connecting the surge tank 30*b* to the intake ports 11 of the cylinders 2*a*.

An air cleaner 31, an intercooler 32, and an intake shutter valve 33 are arranged sequentially in the intake passage 30 upstream of the surge tank 30*b*. The air cleaner 31 is a filter which removes foreign matter from the intake air. The intercooler 32 is a heat exchanger which cools the intake air compressed by the exhaust turbocharger 60. The intake shutter valve 33 is a butterfly valve which is installed in the intake passage 30 to throttle a flow rate of the intake air.

The intake passage 30 is equipped with an air flow sensor SN3, an intake pressure sensor SN4, and an intake temperature sensor SN5. The air flow sensor SN3 detects the flow rate of the intake air introduced into the engine body 2, and is positioned in the intake passage 30 downstream of the air cleaner 31. The intake pressure sensor SN4 detects a pressure of the intake air introduced into the engine body 2, and is disposed at the surge tank 30*b*. The intake temperature sensor SN5 detects the temperature of the intake air, and is disposed downstream of the intercooler 32.

The exhaust passage 40 discharges outside the exhaust gas from the combustion chambers C of the cylinders 2*a*. The exhaust passage 40 has an exhaust manifold 40*a* in its upstream side section closer to the engine body 2. The exhaust manifold 40*a* includes a plurality of branch pipes which communicate with the exhaust ports 12 of the cylinders 2*a* and an exhaust converging section where these branch pipes converge.

A plurality of catalysts for removing various harmful components within the exhaust gas are arranged in the exhaust passage 40 downstream of the exhaust manifold 40*a*. Specifically, an oxidation catalyst 41, a DPF (Diesel Particulate Filter) 42, an SCR (Selective Catalytic Reduction) catalyst 43, and a slip catalyst 44 are arranged in this order from the upstream of the exhaust gas flow. A urea injector 45 and a mixing plate 47 are arranged between the DPF 42 and the SCR catalyst 43 in the exhaust passage 40

The oxidation catalyst 41 oxidizes CO and HC within the exhaust gas to render them harmless. For example, the oxidation catalyst 41 includes a porous carrier and catalyst substances, such as platinum or palladium, supported on the carrier. The DPF 42 collects particulate matters, such as soot contained, within the exhaust gas. The DPF 42 includes catalyst substances, such as platinum, for burning soot under a high-temperature condition during filter regeneration.

The SCR catalyst 43 reduces $NO_x$ in the exhaust gas to render it harmless. The SCR catalyst 43 includes a porous carrier and catalyst substances, such as vanadium, tungsten, or zeolite, supported on the carrier. The SCR catalyst 43 holds ammonia produced from urea water. The SCR catalyst 43 uses this ammonia as a reducing agent in a chemical reaction to convert $NO_x$ in the exhaust gas into $N_2$ and $H_2O$.

The slip catalyst 44 is an oxidative catalyst for oxidizing ammonia slipped from the SCR catalyst 43 which flew downstream without being used for the reduction of $NO_x$. The slip catalyst 44 may have a similar structure to the oxidation catalyst 41, for example.

The urea injector 45 supplies urea water to the SCR catalyst 43. The urea injector 45 injects the urea water made by dissolving highly pure urea, into the exhaust passage 40. The urea injector 45 receives the urea water from a tank 46 storing the urea water via a supply pipe 46*a*. When the urea injector 45 injects the urea water, urea contained in the urea water undergoes hydrolysis at a high temperature, converted into ammonia, and is then absorbed by the SCR catalyst 43. The mixing plate 47 sends the urea water injected by the urea injector 45 to the downstream SCR catalyst 43 while evenly dispersing it. The mixing plate 47 is a plate-like member dividing the exhaust passage 40 into front and rear sections, and has a plurality of openings to stir the exhaust gas.

To activate the SCR catalyst 43 and ensure effective $NO_x$ removal, it is necessary to maintain the SCR catalyst 43 within an appropriate temperature range. For example, this temperature range is a high-temperature range exceeding 150° C. If the temperature of the SCR catalyst 43 drops below a given high-temperature range, the $NO_x$ removal performance of the SCR catalyst 43 degrades. The removal performance of the SCR catalyst 43 degrades, for example, immediately after a cold start of the engine 1 or when the engine 1 undergoes a fuel-cut operation for a long period of time while driving on a long downhill. Note that, also for a three-way catalyst used when the engine 1 a gasoline engine, its exhaust emission control performance degrades when a temperature of the catalyst drops.

In particular, in hybrid vehicles 10, the engine 1 tends to be stopped for a longer period of time, making the temperature of the SCR catalyst 43 to drop easily. For example, while driving on a long downhill, there are situations of driving in reliance on regenerative braking in a state where the engine 1 is stopped by disconnecting the clutch CL1, and a situation of driving with the motor by connecting the clutch CL1. If either of such situations continues for a long period of time, the temperature of the SCR catalyst 43 drops. In view of this issue, in this embodiment, a control is performed in which the temperature of the SCR catalyst 43 is maintained while ensuring that an SOC (state of charge) of the battery 26 does not exceed its upper limit. This control will be described in more detail later.

The exhaust passage 40 is provided with an exhaust $O_2$ sensor SN6, an $NO_x$ concentration sensor SN7, and an exhaust temperature sensor SN8. The exhaust $O_2$ sensor SN6 is disposed in the exhaust passage 40 upstream of the oxidation catalyst 41, and measures an oxygen amount within the exhaust gas. The $NO_x$ concentration sensor SN7 is disposed between the DPF 42 and the SCR catalyst 43, and detects a concentration of $NO_x$ within the exhaust gas. The exhaust temperature sensor SN8 is disposed at a position downstream of the $NO_x$ concentration sensor SN7 and immediately upstream of the SCR catalyst 43, and measures the temperature of the exhaust gas. The detected value of the exhaust temperature sensor SN8 is used to estimate the temperature of the SCR catalyst 43.

The exhaust turbocharger 60 uses the exhaust gas discharged from the combustion chamber C to boost air supplied to the combustion chamber C. The exhaust turbocharger 60 includes a compressor 61, a turbine 62, and a VGT (variable geometry turbocharger) actuator 63. The compressor 61 is disposed in the intake passage 30 between the air cleaner 31 and the intercooler 32. The turbine 62 is disposed in the exhaust passage 40 upstream of the oxidation catalyst 41. The exhaust gas discharged from the engine body 2 is introduced to the turbine 62 to rotatably drive the turbine 62. The compressor 61 rotates in connection with the turbine 62 to pump the intake air downstream. In other words, boosting in which the intake air inside the intake passage 30 is sent to the engine body 2 while being compressed is performed.

The turbine 62 is of a VGT type equipped with a variable vane mechanism which adjusts a flow rate of the exhaust gas (turbine volume). The variable vane mechanism includes a plurality of nozzle vanes of which angles are adjustable. Adjusting the angles of these nozzle vanes changes the flow rate of the exhaust gas. The VGT actuator 63 adjusts the angles of the nozzle vanes.

The EGR device 50 includes an EGR passage 51, an EGR cooler 52, and an EGR valve 53. The EGR passage 51 recirculates the exhaust gas from the exhaust passage 40 to the intake passage 30. The EGR passage 51 connects a section of the exhaust passage 40 upstream of the turbine 62 with a portion of the intake passage 30 between the intake shutter valve 33 and the surge tank 30b. The EGR cooler 52 cools EGR gas recirculated through the EGR passage 51 to the intake passage 30. The EGR valve 53 adjusts a recirculation flow rate of the EGR gas.

Vehicle Control System

Figure 3:
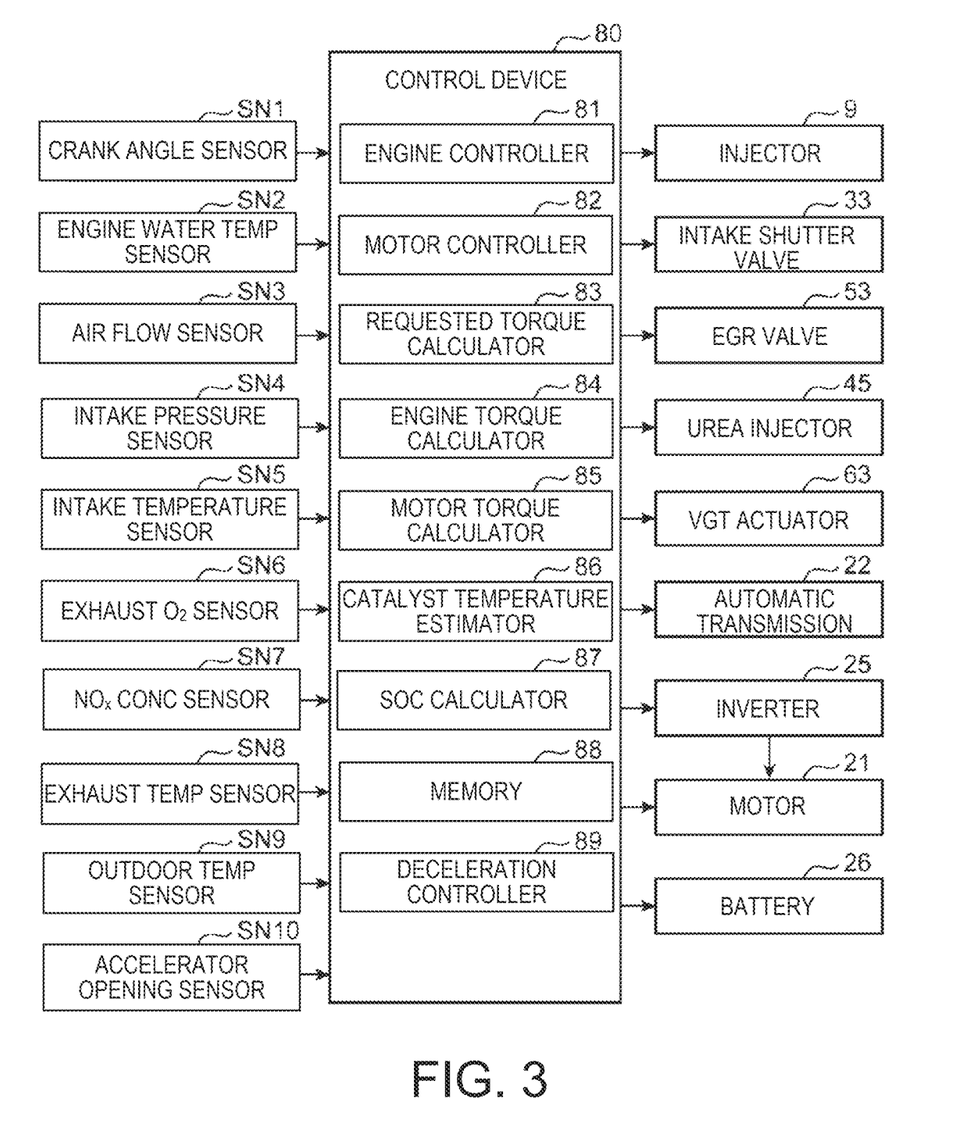
FIG. 3 is a functional block diagram illustrating a control system of the vehicle.

FIG. 3 is a functional block diagram illustrating a control system of the vehicle 10. The vehicle 10 includes the control device 80 which comprehensively controls various parts of the vehicle 10, as well as the engine 1 and the motor 21. Various sensor data is inputted into the control device 80. For example, information detected by the crank angle sensor SN1, the water temperature sensor SN2, the air flow sensor SN3, the intake pressure sensor SN4, the intake temperature sensor SN5, the exhaust $O_2$ sensor SN6, the $NO_x$ concentration sensor SN7, and the exhaust temperature sensor SN8, such as the crank angle, the engine speed, the engine water temperature, the intake flow rate, the intake pressure, the intake temperature, the exhaust oxygen level, the $NO_x$ concentration, and the exhaust temperature, is sequentially inputted to the control device 80.

In addition to the aforementioned sensors, the vehicle 10 also has an outdoor temperature sensor SN9 and an accelerator opening sensor SN10. The outdoor temperature sensor SN9 measures an external ambient temperature around the vehicle 10. The accelerator opening sensor SN10 detects the degree of opening of the accelerator pedal operated by a vehicle driver, i.e., the accelerator opening. The accelerator opening information is used to determine the requested torque for the engine system, including engine 1 and motor 21. The information detected by the outdoor temperature sensor SN9 and the accelerator opening sensor SN10 is also sequentially inputted to the control device 80.

The control device 80 controls the various parts of the vehicle 10 based on the input information from the sensors SN1 to SN10. The control device 80 is electrically connected to the injector 9, the intake shutter valve 33, the EGR valve 53, the urea injector 45, the VGT actuator 63, the automatic transmission 22, and the inverter 25. The control device 80 outputs control signals generated based on the input information from the sensors SN1 to SN10 to these electrically-connected components.

The control device 80 operates to functionally include an engine controller 81, a motor controller 82, a requested torque calculator 83, an engine torque calculator 84, a motor torque calculator 85, a catalyst temperature estimator 86, an SOC calculator 87, a memory 88, and a deceleration controller 89 (controller) by executing specified program(s).

The engine controller 81 controls the operation of the engine 1. The engine controller 81 determines an intake amount, a fuel injection amount, etc., so that the engine 1 outputs a final set engine torque in response to various situations, and controls the injector 9, the intake shutter valve 33, etc. The motor controller 82 controls the inverter 25 so that the motor 21 outputs a final set motor torque.

The requested torque calculator 83 calculates the requested torque of the vehicle 10 based on an accelerator operation by a vehicle driver, i.e., based on the accelerator opening detected by the accelerator opening sensor SN10. In the hybrid vehicle 10 of this embodiment, the requested torque is shared between the engine torque generated by the engine 1 and the motor torque generated by the motor 21. The engine torque calculator 84 calculates the engine torque to be generated by the engine 1, based on a driving condition and the requested torque. The motor torque calculator 85 calculates the motor torque to be generated by the motor 21, based on the driving condition and the requested torque.

The catalyst temperature estimator 86 performs computational processing in which the temperature of the SCR catalyst 43 is estimated. In one example of the computational processing performed by the catalyst temperature estimator 86, a heat input amount to the SCR catalyst 43 is calculated based on the temperature of the exhaust gas at a position immediately before the SCR catalyst 43 which is detected by the exhaust temperature sensor SN8, and the flow rate of the exhaust gas. Note that the flow rate of the exhaust gas can be estimated from the intake flow rate detected by the air flow sensor SN3, the opening degree of the EGR valve 53, etc. Next, a heat release amount from the SCR catalyst 43 is calculated based on the vehicle speed derived from the crank angle sensor SN1 and the external ambient temperature detected by the outdoor temperature sensor SN9. Further, a temperature Ts of the SCR catalyst 43 is calculated based on the heat input amount, the heat release amount, and a heat volume of the SCR catalyst 43 stored in advance. Note that a sensor which directly measures the temperature of the SCR catalyst 43 may be installed instead of the catalyst temperature estimator 86.

The SOC calculator 87 estimates a current SOC of the battery 26. The SOC calculator 87 continuously adds up charge/discharge current values detected by a current detector installed in a charge-discharge circuit of the battery 26, to calculate an accumulated charge amount. The accumulated electrical charge amount is calculated by adding the charged power during the charging operation, and subtracting the released power during the discharging operation. The SOC of the battery 26 is calculated based on the accumulated charge amount.

The memory 88 stores setting value(s) and data necessary for the operations of the control device 80. In this embodiment, the memory 88 stores SOC-related setting information (e.g., first and second given values of the SOC), such as the heat volume of the SCR catalyst 43, a suitable operating temperature of the SCR catalyst 43, and an upper SOC limit of the battery 26 (e.g., 80%).

The deceleration controller 89 performs a temperature maintenance control in which the temperature of the SCR catalyst 43 is maintained within a given high temperature range while ensuring that the SOC of the battery 26 does not exceed its upper limit, during specific deceleration of the vehicle 10, such as when driving on a long downhill. The deceleration controller 89 performs at least the following first or second control as the temperature maintenance control.

First Control: When the SOC of the battery 26 is at or above a first given value corresponding to the SOC upper limit, an engine resistance is increased to obtain a deceleration higher than a requested deceleration. Further, a motor assist operation of the motor 21 is performed according to the increase of the engine resistance. This first control is executed also when the temperature of the SCR catalyst 43 is lower than the set temperature.

Second Control: When the SOC of the battery 26 is at a second given value lower than the first given value, a combustion state of the engine 1 is controlled to raise the temperature of the SCR catalyst 43. Further, the regenerative operation of the motor 21 is performed.

During deceleration of the vehicle 10, when the SOC of the battery 26 is at or above the first given value and the temperature of the SCR catalyst 43 is higher than the set temperature, the above temperature maintenance control is not performed, and one of third and fourth controls is performed.

Third Control: The clutch CL1 is engaged while performing motoring in which the engine is rotated in the fuel-cut state, to generate the engine resistance and decelerate the vehicle using the engine braking.

Fourth Control: The clutch CL1 is released to disconnect the engine 1 from the drive shaft of the drive wheels 24, decelerating the vehicle using regenerative braking based on the regenerative resistance of the motor 21.

Figure 4:
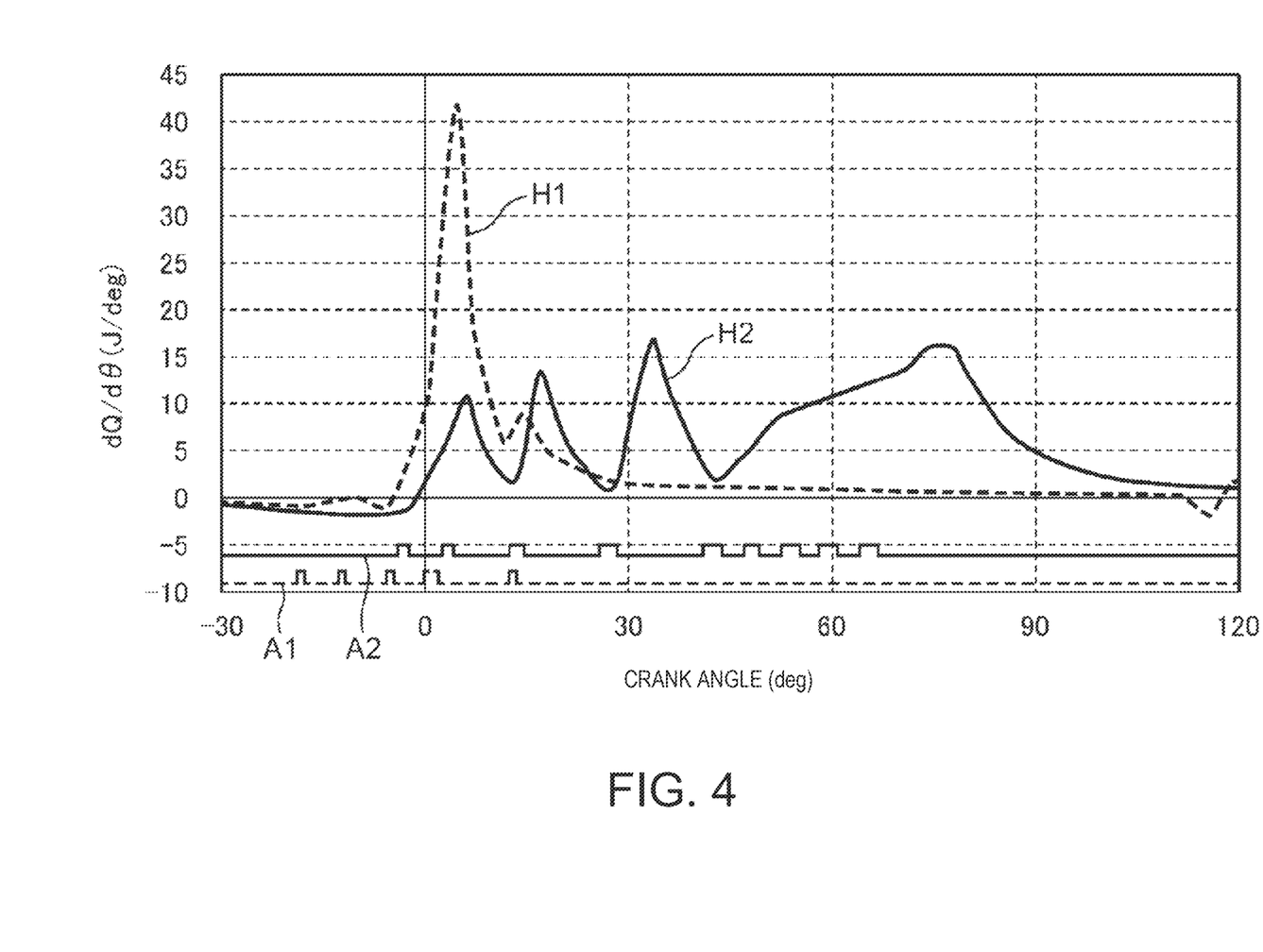
FIG. 4 is a chart illustrating a relationship between a fuel injection pattern of the engine and an in-cylinder heat generation rate.

As a part of the second control to raise the temperature of the SCR catalyst 43, the deceleration controller 89 causes a fuel injection on expansion stroke of the engine 1. FIG. 4 is a chart illustrating a relationship between a fuel injection pattern by the injector 9 of the engine 1 and an in-cylinder heat generation rate (dQ/dθ). A heat generation rate characteristic H1 illustrated in FIG. 4 indicates a heat generation rate of typical combustion performed in the engine body 2 during a normal operation. The heat generation rate characteristic H1 has a large peak at a crank angle slightly retarded from TDC (Top Dead Center), indicating that a higher engine torque can be generated.

A fuel injection pattern A1 illustrated in the lower part of FIG. 4 is a split injection pattern performed by the injector 9 during the normal operation. In the fuel injection pattern A1, the injection is mainly performed in a latter half of the compression stroke and near the TDC. By performing the fuel injection in such a pattern, it is possible to achieve compression ignition combustion which exhibits the heat generation rate characteristic H1 in which the engine torque is generated.

Another heat generation rate characteristic H2 illustrated in FIG. 4 indicates the heat generation rate of combustion performed in the engine body 2 during the temperature maintenance control. The heat generation rate characteristic H2 shows a plurality of small peaks on expansion stroke after TDC. In other words, the heat generation rate characteristic H2 indicates that combustion with a small heat generation rate continues from the TDC to an intermediate range of the expansion stroke. Even when the combustion with such a heat generation rate characteristic H2 occurs in the engine body 2, the engine torque is not substantially generated. However, it is possible to send high-temperature exhaust gas resulting from the combustion to the exhaust passage 40. Therefore, by performing the combustion with the heat generation rate characteristic H2, the temperature of the SCR catalyst 43 can be raised or maintained. That is, the temperature maintenance of the SCR catalyst 43 can be achieved without performing such combustion that generates an engine torque during deceleration.

A fuel injection pattern A2 is a split injection pattern performed by the injector 9 during the temperature maintenance control. In the fuel injection pattern A2, a plurality of fuel injections are performed from near the TDC to the intermediate range of the expansion stroke. The fuel injection near the TDC is intended to raise the in-cylinder temperature so that the fuel injected in the intermediate range of the expansion stroke combusts without causing misfire, and is not intended to generate an engine torque.

When executing the fuel injection pattern A2 for maintaining the temperature of the SCR catalyst 43, it is desirable for the deceleration controller 89 to control the exhaust turbocharger 60 to increase a boosting pressure. Specifically, the deceleration controller 89 operates the VGT actuator 63 to adjust the angles of the nozzle vanes so that the flow rate of the exhaust gas increases. Thus, the rotation speed of the compressor 61 and the boosting pressure are increased. When the fuel injection is performed on the expansion stroke where the piston 5 descends, the fuel tends to adhere to an inner wall of the cylinder 2*a*, i.e., the cylinder liner. In this case, the fuel may enter an oil pan of the cylinder block 3, potentially causing fuel dilution of the engine oil. Increasing the boosting pressure shortens a traveling distance of the fuel injected into the cylinder 2*a*, resulting in suppression of the fuel adhesion to the cylinder liner.

Specific Example of Temperature Maintenance Control

Figure 5:
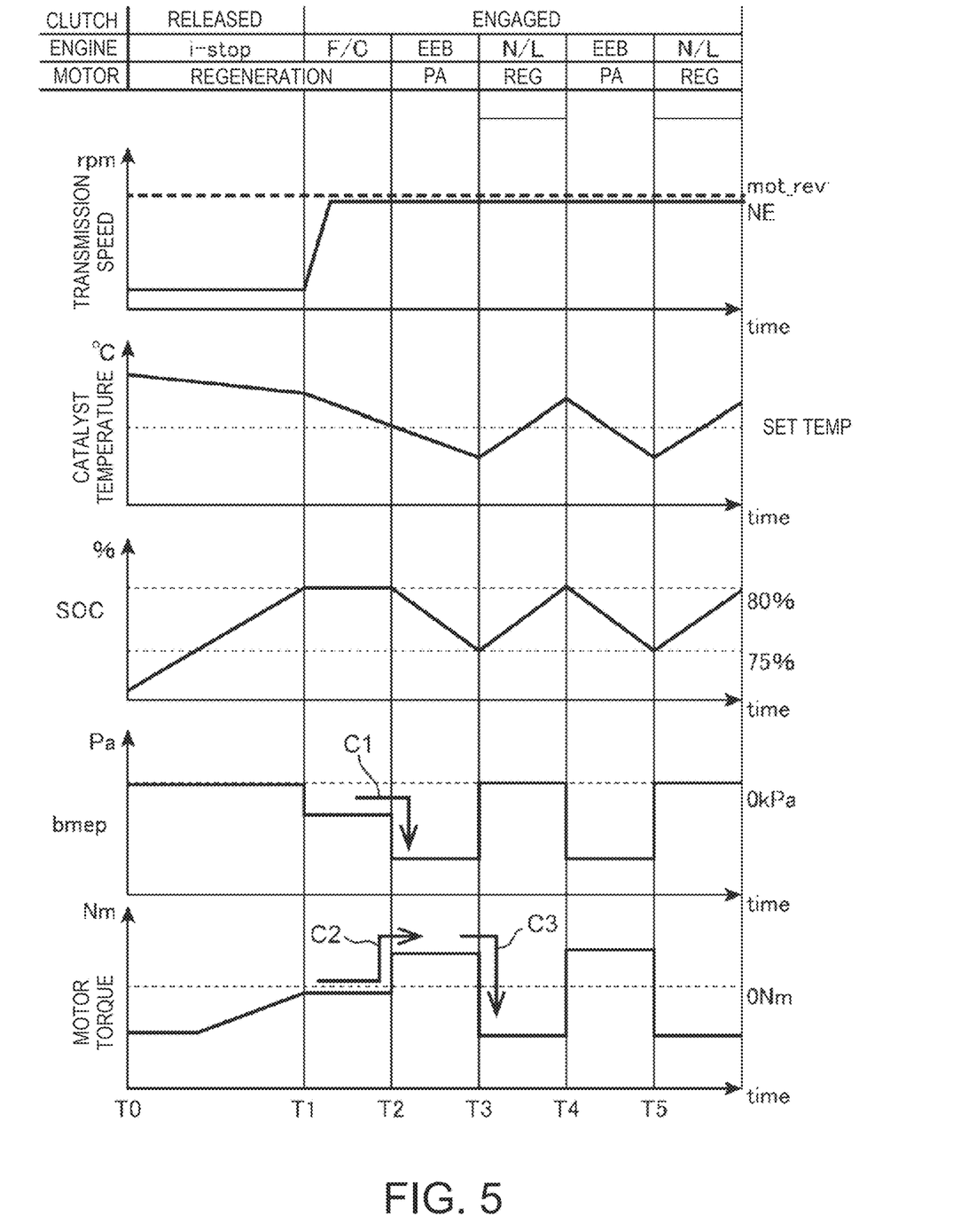
FIG. 5 is a time chart illustrating operations of the engine and a motor in a downhill driving mode of the vehicle.

FIG. 5 is a time chart illustrating the operations of the engine and the motor during the temperature maintenance control in the downhill driving mode of the vehicle. FIG. 5 illustrates, in the order from the top, charts of the transmission speed, the catalyst temperature, the SOC, bmep (brake mean effective pressure), and the motor torque. A table indicating operating states of the clutch CL1, the engine 1, and the motor 21 is also provided above the chart.

The transmission speed (rpm) indicates the rotational speed of the shaft of the automatic transmission 22. When the engine 1 is disconnected by releasing the clutch CL1, the transmission speed=the rotational speed of the motor 21 (mot_rev). When the clutch CL1 is engaged, the transmission speed=mot_rev=the engine speed (NE). The catalyst temperature (° C.) is the temperature of the SCR catalyst 43 obtained by the catalyst temperature estimator 86.

The SOC is the remaining charge of the battery 26 obtained by the SOC calculator 87. In FIG. 5, SOC=80% is exemplified as the first given value, which is the SOC upper limit, and SOC=75% is exemplified as the second given value, which is a threshold for switching the battery 26 from the discharge mode to the charge mode in the temperature maintenance control. The first and second given values can be appropriately set according to the characteristics of the battery 26, control philosophy, etc.

"bmep" (Pa) is an index indicating a pressure of the engine brake of the engine 1. When the bmep=(Pa), both the engine braking and the engine torque are zero. In a negative region where the bmep is below 0 (Pa), engine braking occurs and the vehicle 10 decelerates. In the positive region, the engine torque is generated and the vehicle 10 accelerates. The motor torque (Nm) indicates the torque generated by the motor 21 and regenerative braking. In the negative region where the motor torque is below 0 (Nm), the regenerative braking occurs. In the positive region, the motor torque is generated.

Time T0 is a certain time point at which the downhill driving is already ongoing and the above fourth control is performed. At time T0, the catalyst temperature is still higher than the set temperature, and the SOC is below the first given value (80%). The vehicle 10 is decelerating with the regenerative braking. In other words, the clutch CL1 is released, and the engine 1 is stopped (i-stop). Only the motor 21 which is coupled to the drive shaft of the drive wheels 24 via the automatic transmission 22 generates braking force according to the regenerative resistance. After time T0, the catalyst temperature drops since the engine 1 is in the stopped state, and the SOC increases as the motor 21 performs the regenerative operation.

Time T1 is a time point at which the SOC reaches the first given value and the control mode shifts from the fourth control to the third control. Here, the catalyst temperature is still above the set temperature. Upon reaching time T1, the deceleration controller 89 engages the clutch CL1 and rotates the engine 1 in the fuel-cut state (F/C). As a result, the engine braking occurs as indicated by the chart of the bmep. Meanwhile, the deceleration controller 89 controls the inverter 25 to stop the regenerative operation, preventing an increase in the SOC. Therefore, the vehicle 10 decelerates through the engine braking provided by the motoring of the engine 1. After time T1, as the engine 1 remains in the fuel-cut state, the catalyst temperature continues to drop while the SOC is maintained at the first given value.

Time T2 is a time point at which the SOC is at the first given value and the catalyst temperature drops to the set temperature. Upon reaching time T2, the deceleration controller 89 performs the above first control. Specifically, the deceleration controller 89 increases the engine resistance so that the deceleration exceeds the requested deceleration calculated by the requested torque calculator 83. In other words, a second engine resistance above a first engine resistance set at time T1 is set, and the engine braking is enhanced (illustrated as "EEB (Enhanced Engine Braking)" in the table of FIG. 5).

On the other hand, if the engine braking is excessively enhanced, the vehicle driver may feel uncomfortable with the deceleration state. In view of this, the deceleration controller 89 causes the motor 21 to perform the motor assist operation according to the increased engine resistance (illustrated as "PA (Power Assist)" in the table of FIG. 5). The deceleration controller 89 instructs the motor controller 82 to supply drive power to the motor 21 via the inverter 25 so that the motor 21 generates driving force. By such a control, the enhanced engine braking is offset by the motor torque generated based on the motor assist operation, maintaining drivability. Further, by supplying power to the motor 21, the SOC of the battery 26 is consumed, creating a state where the regenerative braking is available. In other words, even if the catalyst temperature is the set temperature or below, the first control is performed first to discharge the battery 26 in order to provide some margin for the SOC. After time T2, since the state where the engine 1 does not perform combustion continues, the catalyst temperature further drops while the SOC decreases from the first given value.

In the first control, one example of the control of increasing the engine resistance is a control of decreasing the in-cylinder pressure within the cylinder 2a to be lower than the surrounding environment to increase a motional resistance to the piston 5. Specifically, operating the intake shutter valve 33 or controlling the opening timing of the intake valve 13 may be included. Closing the intake shutter valve 33 creates a semi-sealed state inside the cylinder 2a, increasing the motional resistance to the piston 5. Creating a negative overlap period where both the intake valve 13 and the exhaust valve 14 are closed by retarding the opening timing of the intake valve 13 seals cylinder 2a, and can increase the motional resistance to the piston 5. Increasing the motional resistance to the piston 5 leads to the increased engine resistance, enhancing the engine braking.

Another example of the control of increasing the engine resistance is a control of downshifting the automatic transmission 22. When it is requested to increase the engine resistance, the automatic transmission 22 is downshifted by one or more gears from the current gear to increase the engine speed. Increasing the engine speed makes it easier to increase the engine resistance.

Time T3 is a time point at which the SOC decreases to the second given value (75%) and the catalyst temperature drops to below the set temperature. Upon reaching time T3, the deceleration controller 89 performs the above second control. The deceleration controller 89 instructs the engine controller 81 to perform combustion to maintain the temperature of the SCR catalyst 43. The engine controller 81 causes combustion to only heat the catalyst, by controlling the injector 9 to perform a fuel injection in the fuel injection pattern A2 of FIG. 4. In other words, the combustion state is controlled so that an engine load becomes zero (illustrated as "N/L" in the table of FIG. 5). By this control, the engine braking is lost as indicated by the bmep chart.

At time T3, since the SOC has decreased to the second given value, the motor 21 can perform the regenerative operation. The motor 21 is controlled to perform the regenerative operation by using the margin of the SOC, which is the difference between the first given value and the second given value, to generate the regenerative braking. The deceleration controller 89 instructs the motor controller 82 to generate the regenerative resistance to compensate for the loss of the engine braking. In other words, the deceleration equivalent to the engine braking is created by the regenerative braking.

As described above, when the SOC is the first given value or above, the first control is performed even if the catalyst temperature is below the set temperature. Then, when the SOC decreases to the second given value as a result of the first control, the control mode is switched to the second control. Thus, even when the catalyst temperature is below the set temperature, the cooperative control is performed in which the first control is first performed to discharge the battery 26 and create the margin for the SOC, and then the second control is performed to raise the temperature of the SCR catalyst 43. An excessive deceleration torque generated by enhancing the engine braking in the first control can be offset by the motor torque gained from the motor assist operation. Additionally, the second control following the first control can create the deceleration equivalent to the engine braking through the regenerative braking. Therefore, drivability can be maintained without causing discomfort to the vehicle driver during deceleration.

After time T3, since the engine body 2 performs the combustion to maintain the catalyst temperature, the catalyst temperature rises. Meanwhile, the motor 21 performs the regenerative operation, and thus the SOC increases. Time T4 is a time point at which the SOC recovers to the first given value (80%) while the vehicle 10 continues to decelerate. In this case, the deceleration controller 89 switches the control mode from the second control to the first control. Specifically, the deceleration controller 89 generates the engine braking by the enhanced second engine resistance, and generates the regenerative braking force to offset the enhanced engine braking force. Thus, drivability is maintained while suppressing the increase of the SOC.

Figure 6:
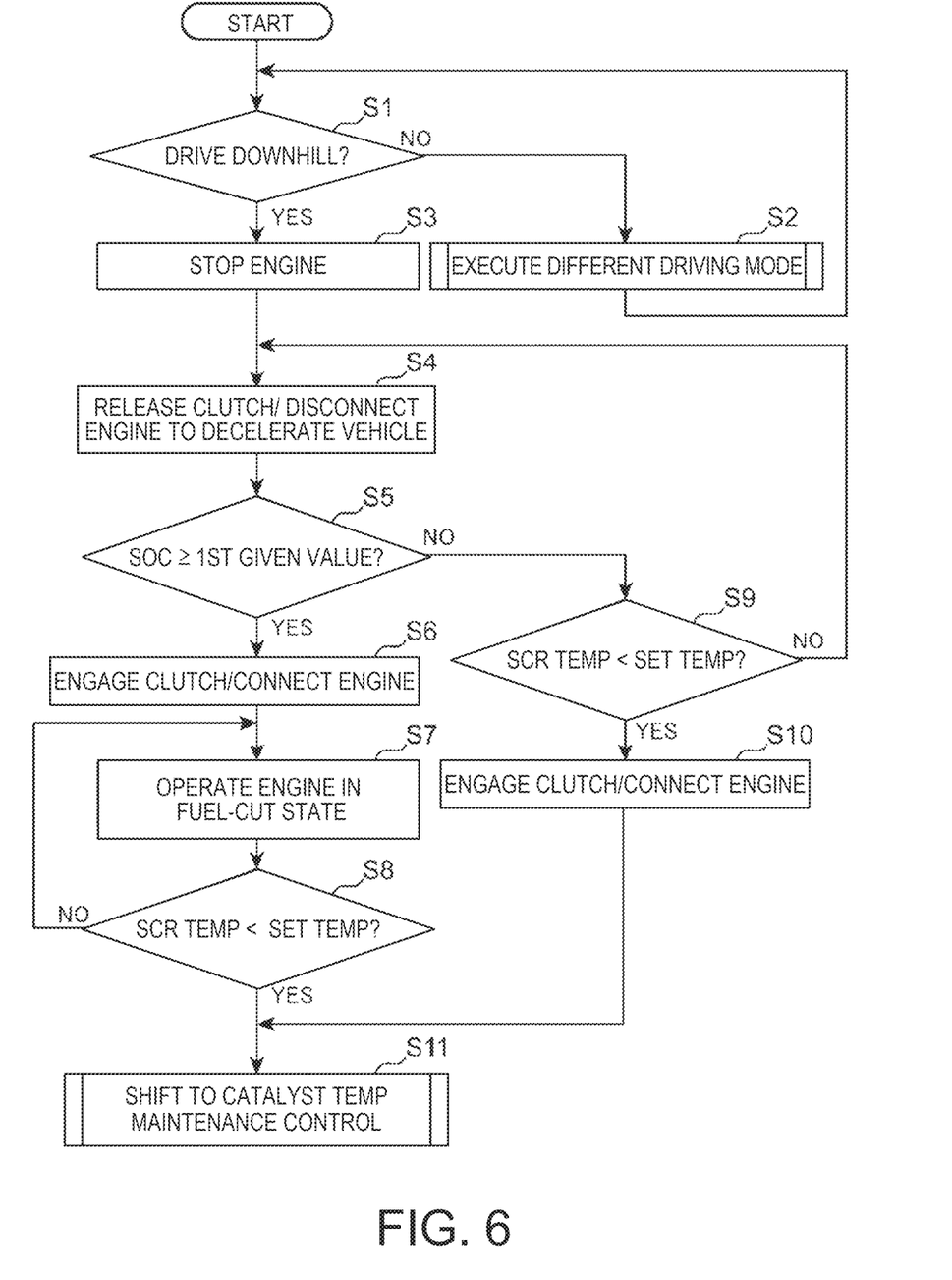
FIG. 6 is a flowchart illustrating an example of a deceleration control in the downhill driving mode of the vehicle by the control device of one embodiment.

Subsequently, when the SOC decreases to the second given value (75%) at time T5, the deceleration controller 89 switches the control mode from the first control to the second control. Thereafter, during the deceleration of the vehicle 10, the first and second controls are repeated according to the SOC of the battery 26. Therefore, even while driving on a long downhill, the temperature of the SCR catalyst 43 can be maintained without overcharging the battery 26. Example of Vehicle Deceleration Control FIG. 6 is a flowchart illustrating one example of a deceleration control in the downhill driving mode of the vehicle 10 by the control device 80. While the vehicle 10 drives, the control device 80 determines whether the vehicle 10 is on a downhill (Step S1). This determination can be made based on measured data, such as the accelerator opening detected by the accelerator opening sensor SN10, the vehicle speed and acceleration based on the crank angle sensor SN1, and a decrease in the intake pressure due to the vehicle traveling by its own weight which is detected by the intake pressure sensor SN4.

If it is determined that the vehicle is not driving downhill (NO at Step S1), the control device 80 executes a different driving mode according to an engine control algorithm based on the detection results of the various sensors (Step S2). Conversely, if it is determined that the vehicle is driving downhill (YES at Step S1), the deceleration controller 89 of the control device 80 stops the engine 1 via the engine controller 81 (Step S3). Further, the deceleration controller 89 releases the clutch CL1 and decelerates the vehicle 10 by using the regenerative braking of the motor 21 (Step S4). This state at Step S4 corresponds to the state at time T0 in the time chart of FIG. 5.

Next, the deceleration controller 89 determines whether the SOC of the battery 26 is or exceeds the first given value (SOC=80% in the example of FIG. 5) based on the output value of the SOC calculator 87 (Step S5). If the SOC is at or above the first given value (YES at Step S5), continuing the regenerative operation in the motor 21 causes the battery 26 to overcharge. Therefore, the deceleration controller 89 decelerates the vehicle 10 by using the engine braking instead of the regenerative braking.

Specifically, the deceleration controller 89 engages the clutch CL1 and connects the engine 1 to the drive shaft of the drive wheels 24 (Step S6). Note that the deceleration controller 89 performs the motoring in which the engine is rotated in the fuel-cut state without supplying the fuel from the injector 9 (Step S7). This state at Step S7 corresponds to the state at time T1 in the time chart of FIG. 5.

Subsequently, the deceleration controller 89 determines whether the temperature of the SCR catalyst 43 (hereinafter referred to as "SCR temperature") is below the given setting temperature based on the output value of the catalyst temperature estimator 86 (Step S8). If the SCR temperature is below the setting temperature (Step S8: YES), the deceleration controller 89 performs the catalyst temperature maintenance control to maintain the temperature of the SCR catalyst 43 (Step S11). Conversely, if the SCR temperature is the setting temperature or above (Step S8: NO), the deceleration controller 89 continues the motoring from Step S7.

If, at Step S5, the SOC is below the first given value (Step S5: NO), the deceleration controller 89 determines whether the SCR temperature is below the setting temperature (Step S9). If the SCR temperature is the setting temperature or above (Step S9: NO), both the SOC and the SCR temperature have margins. Therefore, the process returns to Step S4, where the deceleration of the vehicle 10 by using the regenerative braking continues. Conversely, if the SCR temperature is below the setting temperature (Step S9: YES), the deceleration controller 89 performs the control of engaging the clutch CL1 to connect the engine 1 to the drive shaft of the driven wheels 24 (Step S10). The deceleration controller 89 then performs the catalyst temperature maintenance control (Step S11).

Figure 7:
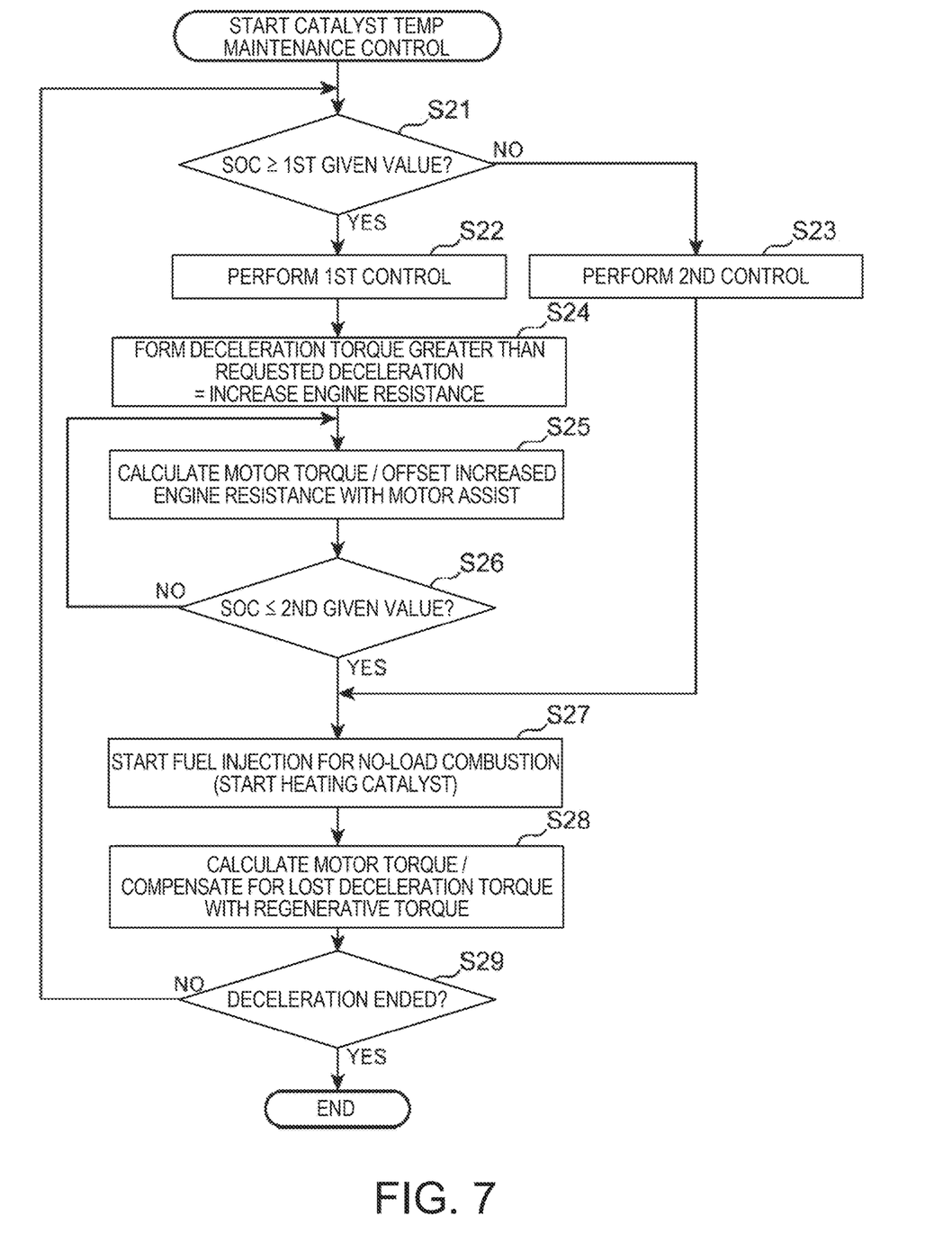
FIG. 7 is a flowchart illustrating an example of a catalyst temperature maintenance control by the control device of this embodiment.

FIG. 7 is a flowchart illustrating one example of the catalyst temperature maintenance control by the deceleration controller 89. The deceleration controller 89 determines whether the SOC of the battery 26 is the first given value or above (Step S21). If the SOC is the first given value or above (Step S21: YES), the deceleration controller 89 decides to perform the above first control (Step S22). If the SOC is below the first given value (Step S21: NO), the deceleration controller 89 decides to perform the above second control (Step S23).

In the first control, the deceleration controller 89 forms a deceleration torque greater than the requested deceleration derived by the request torque calculator 83 (Step S24). Specifically, the deceleration controller 89 executes one or more of the following measures: closing the intake shutter valve 33; retarding the opening timing of the intake valve 13; and downshifting the gear of the automatic transmission 22. Thus, the engine resistance is increased and the engine braking is enhanced. An arrow C1 of FIG. 5 corresponds to the enhancement of the engine braking at Step S24.

Additionally, the deceleration controller 89 causes the motor 21 to perform the motor assist operation (Step S25). That is, the motor torque calculator 85 calculates the motor torque corresponding to the increased engine resistance described above. The deceleration controller 89 instructs the motor controller 82 to control the motor 21 to generate the calculated motor torque. An arrow C2 of FIG. 5 corresponds to the generation of the motor torque at Step S25. This control cancels out the enhanced engine braking with the motor torque, and thus the vehicle driver does not feel discomfort from a sudden change in deceleration. The timing when these controls at Steps S24 and S25 start corresponds to time T2 of FIG. 5.

Next, the deceleration controller 89 determines whether the SOC of the battery 26 is the second given value (SOC=75% in the example of FIG. 5) or below, based on the output value of the SOC calculator 87 (Step S26). If the SOC is the second given value (Step S26: YES) or below, the SOC has enough margin for the battery 26 to operate in the charging mode. In this case, the deceleration controller 89 performs the second control in which the engine 1 performs no-load combustion to raise the temperature of the SCR catalyst 43 and the motor 21 performs the regenerative operation. The definition of the case where Step S26=YES is equivalent to the case of Step S23 where the execution of the second control is decided, in terms of control.

Specifically, the deceleration controller 89, through the engine controller 81, causes the injector 9 to perform the fuel injection which causes the engine 1 to perform the no-load combustion, as illustrated in the fuel injection pattern A2 of FIG. 4 (Step S27). By this control, the combusted gas flows through the exhaust passage 40 and the heating of the SCR catalyst 43 starts. Meanwhile, the engine braking is lost due to the engine combustion. Therefore, the deceleration controller 89 causes the motor torque calculator 85 to calculate the required motor torque to compensate for the deceleration torque corresponding to the current requested deceleration by using the regenerative braking. Further, the deceleration controller 89 causes the motor 21 to perform the regenerative operation to generate the regenerative torque corresponding to the calculated motor torque (Step S28).

The timing at which the controls of Steps S27 and S28 start corresponds to time T3 of FIG. 5. An arrow C3 of FIG. 5 corresponds to the transition from the motor assist operation to the regenerative operation at Step S28. If no deceleration end is detected (Step S29: NO), the process returns to Step S21 and repeats. If a deceleration end is detected (Step S29: YES), the deceleration controller 89 ends the catalyst temperature maintenance control.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
2 Engine Body
7 Crankshaft (Output Shaft)
10 Vehicle
21 Motor
22 Automatic Transmission
24 Drive Wheels
26 Battery
40 Exhaust Passage (Exhaust System)
43 SCR Catalyst (Catalyst)
60 Exhaust Turbocharger (Booster)
80 Control Device
89 Deceleration Controller (Controller)
C Combustion Chamber
CL1 Clutch

What is claimed is:

1. A control device of a vehicle, the vehicle including:
an engine having an exhaust system provided with a combustion chamber and a catalyst, and configured to generate a driving force to operate drive wheels of the vehicle;
a motor able to operate the drive wheels; and
a battery configured to supply driving power to the motor in a motor assist operation in which the motor operates the drive wheels, and to be charged in a regenerative operation in which the motor generates power,
the control device comprising a controller configured to control operation of the vehicle,
wherein, when the vehicle decelerates, the controller performs:
a first control in which an engine resistance is increased to obtain a higher deceleration than a requested deceleration and the motor assist operation is performed according to an increase of the engine resistance, when a state of charge (SOC) of the battery is a first given value or above; and
a second control in which a combustion state of the engine is controlled to raise a temperature of the catalyst, and the regenerative operation is performed, when the SOC of the battery is a second given value that is below the first given value.

2. The control device of the vehicle of claim 1, wherein the controller performs the first control and the second control when the temperature of the catalyst is below a set temperature during deceleration of the vehicle, and switches a control mode to the second control when the SOC drops to the second given value by performing the first control.

3. The control device of the vehicle of claim 2,
wherein the vehicle further includes a clutch configured to change a torque transmission state between an output shaft of the engine and a drive shaft of the drive wheels, and
wherein the controller performs:
a third control in which the clutch is engaged and the engine is operated in a fuel-cut state to generate a first engine resistance, when the SOC is the first given value or above and the temperature of the catalyst is above the set temperature in a state where the clutch is released to disconnect the engine from the drive shaft and the vehicle decelerates by a regenerative resistance generated by the regenerative operation of the motor; and
the first control using a second engine resistance that is above the first engine resistance, when the temperature of the catalyst decreases to be below the set temperature during the third control.

4. The control device of the vehicle of claim 2, wherein, after the control mode is switched to the second control, the controller switches the control mode to the first control when the SOC is the first given value or above while the vehicle continues to decelerate.

5. The control device of the vehicle of claim 2, wherein, in the second control, the controller controls the combustion state so that a load of the engine becomes zero.

6. The control device of the vehicle of claim 2, wherein the controller sets a regenerative resistance of the motor in the second control so as to compensate for a loss of the engine resistance caused by switching from the first control to the second control.

7. The control device of the vehicle of claim 2,
wherein the engine is provided with a piston and a cylinder, and
wherein, as the first control of increasing the engine resistance, the controller performs a control of increasing a resistance of the piston by decreasing a pressure inside the cylinder to be lower than that of a surrounding environment.

8. The control device of the vehicle of claim 2,
wherein the vehicle includes a transmission arranged between output shafts of the engine and the motor, and a drive shaft of the drive wheels, and
wherein, as the first control of increasing the engine resistance, the controller performs a control of downshifting a gear of the transmission.

9. The control device of the vehicle of claim 2, wherein, as the second control of raising the temperature of the catalyst, the controller performs a fuel injection on expansion stroke of the engine.

10. The control device of the vehicle of claim 9,
wherein the vehicle includes a booster configured to boost air to be supplied into the combustion chamber of the engine, and
wherein the controller controls the booster to increase a boosting pressure during the second control of raising the temperature of the catalyst.

11. The control device of the vehicle of claim 1, wherein, in the second control, the controller controls the combustion state so that a load of the engine becomes zero.

12. The control device of the vehicle of claim 1,
wherein the vehicle includes a transmission arranged between output shafts of the engine and the motor, and a drive shaft of the drive wheels, and
wherein, as the first control of increasing the engine resistance, the controller performs a control of downshifting a gear of the transmission.

13. A control device of a vehicle, the vehicle including:
an engine having an exhaust system provided with a combustion chamber and a catalyst, and a piston and a cylinder configured to generate a driving force to operate drive wheels of the vehicle;
a motor able to operate the drive wheels; and
a battery configured to supply driving power to the motor in a motor assist operation in which the motor operates the drive wheels, and to be charged in a regenerative operation in which the motor generates power,
the control device comprising a controller configured to control operation of the vehicle,
wherein, when the vehicle decelerates, the controller performs:
   a first control in which an engine resistance is increased to obtain a higher deceleration than a requested deceleration and the motor assist operation is performed according to an increase of the engine resistance, when a state of charge (SOC) of the battery is a first given value or above; and
   a second control in which a combustion state of the engine is controlled to raise a temperature of the catalyst, and the regenerative operation is performed, when the SOC of the battery is a second given value that is below the first given value, and wherein, as the first control of increasing the engine resistance, the controller performs a control of increasing a resistance of the piston by decreasing a pressure inside the cylinder to be lower than that of a surrounding environment.

14. A control device of a vehicle, the vehicle including:
an engine having an exhaust system provided with a combustion chamber and a catalyst, and configured to generate a driving force to operate drive wheels of the vehicle;
a motor able to operate the drive wheels; and
a battery configured to supply driving power to the motor in a motor assist operation in which the motor operates the drive wheels, and to be charged in a regenerative operation in which the motor generates power,
the control device comprising a controller configured to control operation of the vehicle,
wherein, when the vehicle decelerates, the controller performs:
   a first control in which an engine resistance is increased to obtain a higher deceleration than a requested deceleration and the motor assist operation is performed according to an increase of the engine resistance, when a state of charge (SOC) of the battery is a first given value or above; and
   a second control in which a combustion state of the engine is controlled to raise a temperature of the catalyst, and the regenerative operation is performed, when the SOC of the battery is a second given value that is below the first given value, and
wherein, as the second control of raising the temperature of the catalyst, the controller performs a fuel injection on expansion stroke of the engine.

15. The control device of the vehicle of claim 14,
wherein the vehicle includes a booster configured to boost air to be supplied into the combustion chamber of the engine, and
wherein the controller controls the booster to increase a boosting pressure during the second control of raising the temperature of the catalyst.

* * * * *